United States Patent Office 3,553,938
Patented Jan. 12, 1971

3,553,938
METHOD FOR SEPARATING AND RECOVERING HYDROGEN FLUORIDE
Kikuji Hirayama, Onoda, Yamaguchi, Keiji Nakano, Yoshiki-gun, Yamaguchi, and Takeshi Mitsui, Onoda, Yamaguchi, Japan, assignors to Onoda Cement Company, Limited, Onoda, Yamaguchi Prefecture, Japan
No Drawing. Filed Mar. 14, 1969, Ser. No. 807,439
Claims priority, application Japan, Mar. 21, 1968, 43/17,991
Int. Cl. B01d *19/00*
U.S. Cl. 55—71                                             9 Claims

ABSTRACT OF THE DISCLOSURE

This invention relates to a method for recovering hydrogen fluoride from a gaseous mixture containing hydrogen fluoride and impurities by contacting the gaseous mixture with at least one of absorptive liquids thereby to absorb said hydrogen fluoride into said absorptive liquid and then recovering said hydrogen fluoride by heating the resultant absorptive liquid under evaporation. The hydrogen fluoride thus recovered has high purity. The absorptive liquids include phosphoric acid, poly-phosphoric acid, fluoro-phosphoric acid or mixtures thereof. Also the absorptive liquids may contain sulphuric acid and fluorosulphuric acid in addition to the phosphoric acid, polyphosphoric acid, fluoro-phosphoric acid and the mixtures thereof.

---

This invention relates to a method for separating and recovering hydrogen fluoride from a gaseous mixture containing said hydrogen fluoride by selectively absorbing said hydrogen fluoride into at least one of absorptive liquids including various types of phosphoric acids, fluoro-phosphoric acid or mixtures thereof or a mixture of such a phosphoric acid or fluoro-phosphoric acid and sulphuric acid or fluoro-sulphuric acid, and then evaporating said hydrogen fluoride with high purity from said absorptive liquid.

Heretofore, there were proposed in the art some methods for separating and recovering hydrogen fluoride from a gaseous mixture containing said hydrogen fluoride and impurities. For example, U.S. Pat. No. 2,450,415 discloses a method for separating hydrogen fluoride from the gaseous reaction products which are produced by the halogen-exchange reaction between carbon tetrachloride and hydrogen fluoride conducted under super atmospheric pressures by cooling said gaseous reaction product to a temperature of from −60° C. to 20° C. thereby to remove hydrogen chloride from said gaseous reaction product, fractionally distilling and condensing dichlorodifluoromethane and hydrogen fluoride thereby to form a liquid having two layers and then separating said hydrogen fluoride from said liquid. The method, however, is not preferable because it requires some complicated operations and apparatus. U.S. Pat. No. 2,426,841 discloses a method using sulphuric acid as an absorptive agent for absorbing hydrogen fluoride contained in a gaseous mixture of ethylenic hydrocarbons and said hydrogen fluoride. U.S. Pat. No. 2,434,040 discloses a method using fluoro-sulphuric acid as an absorptive agent for absorbing hydrogen fluoride. These methods, however, are not preferable because the ethylenic hydrocarbons are absorbed and carbonized in the sulphuric acid or the fluoro-sulphuric acid causing loss of the hydrocarbons and also the absorptive agents are contaminated with hydrocarbons and carbonized substances.

The inventors have long investigated an improved method for separating and recovering hydrogen fluoride from a gaseous mixture containing said hydrogen fluoride and impurities and have found that phosphoric acid and fluoro-phosphoric acid are the preferable absorptive agents.

The inventors also have found that a mixture of such a phosphoric acid or such a fluoro-phosphoric acid in excess of the specified amount and the conventional absorptive agent such as the sulphuric acid or the fluoro-sulphuric acid becomes a good absorptive agent which is not varied in ability for absorbing hydrogen fluoride and does not essentially absorb acetylenic and ethylenic hydrocarbons, and hydrogen halides other than hydrogen fluoride.

The hydrogen fluoride and hydrogen chloride were tested for absorbability in the absorptive agents and the test results are given in the following Tables 1 to 4.

TABLE 1.—SOLUBILITY OF HYDROGEN FLUORIDE IN THE PHOSPHORIC ACID SOLUTION

| | Absorbing temp., °C. | Partial pressure of HF, mm. Hg | Solubility, gram 100% $H_3PO_4$ | 80% $H_3PO_4$ |
|---|---|---|---|---|
| Test numbers: | | | | |
| 1 | 55 | 760 | 250 | |
| 2 | 65 | 760 | 200 | 206 |
| 3 | 75 | 760 | 157.5 | 169 |
| 4 | 86 | 760 | | 123 |
| 5 | 95 | 760 | 75 | |
| 6 | 99 | 760 | | 71 |
| 7 | 37 | 230 | 237 | |
| 8 | 7 | 100 | 207.5 | |

NOTE.—Solubility was measured in the grams of hydrogen fluoride dissolved in 100 grams of the phosphoric acid solution.

TABLE 2.—SOLUBILITY OF HYDROGEN FLUORIDE IN THE MIXED SOLUTION CONTAINING PHOSPHORIC ACID AND SULPHURIC ACID

| | Absorbing temp., °C. | Partial pressure of HF, mm. Hg | Solubility, gram Mixed solution [1] | Mixed solution [2] |
|---|---|---|---|---|
| Test numbers: | | | | |
| 1 | 45 | 760 | 212.5 | |
| 2 | 60 | 760 | 110 | 136 |
| 3 | 71 | 760 | 75 | 106 |
| 4 | 81 | 760 | | 74.2 |
| 5 | 88 | 760 | 50 | |
| 6 | 95 | 760 | 30 | |
| 7 | 98 | 760 | | 35 |

[1] Having the weight ratio=1 of $H_3PO_4$ (100%) to $H_2SO_4$ (95%).
[2] Having the weight ratio=1 of $H_3PO_4$ (80%) to $H_2SO_4$ (80%).
NOTE.—Solubility was measured in the grams of hydrogen fluoride dissolved in 100 grams of the mixed solution containing phosphoric acid and sulphuric acid.

TABLE 3.—SOLUBILITY OF HYDROGEN CHLORIDE IN PHOSPHORIC ACID AND THE MIXED SOLUTION CONTAINING PHOSPHORIC ACID AND SULPHURIC ACID

| | Absorbing temp., °C. | Partial pressure of HCl, mm. Hg | Solubility, gram $H_3PO_4$ (80%) | Mixed solution [1] |
|---|---|---|---|---|
| Test numbers: | | | | |
| 1 | 41.5 | 760 | 10.2 | |
| 2 | 44 | 760 | | 2.1 |
| 3 | 63 | 760 | | 1.3 |
| 4 | 65 | 760 | 7.8 | |
| 5 | 84 | 760 | 6.2 | 0.7 |
| 6 | 99 | 760 | 5.1 | 0.4 |

[1] Having the weight ratio=1 of $H_3PO_4$ (80%) to $H_2SO_4$ (80%).
NOTE.—Solubility was measured and indicated as in Tables 1 and 2.

TABLE 4.—SOLUBILITY OF HYDROGEN CHLORIDE IN THE MIXED SOLUTION CONTAINING PHOSPHORIC ACID AND HYDROFLUORIDE ACID AND THE MIXED SOLUTION CONTAINING PHOSPHORIC ACID, SULPHURIC ACID AND HYDROFLUORIC ACID

| | Absorbing temp., °C. | Partial pressure of HCl, mm. Hg | Solubility, gram | |
|---|---|---|---|---|
| | | | Mixed solution [1] | Mixed solution [2] |
| Test numbers: | | | | |
| 1 | 18 | 760 | 3.83 | |
| 2 | 23 | 760 | | 0.81 |
| 3 | 45 | 760 | | 0.32 |
| 4 | 61 | 760 | 0.29 | |
| 5 | 70 | 760 | 0.12 | |

[1] Containing phosphoric acid and hydrofluoric acid as shown in Test No. 6 of Table 1.
[2] Containing $H_3PO_4$, $H_2SO_4$ and hydrofluoric acid as shown in Test No. 7 of Table 2.
NOTE.—Solubility was measured and indicated as in Tables 1 and 2.

It is observed from the data as shown in Tables 1, 2 and 3 that the solubility of hydrogen fluoride in the phosphoric acid and the mixed solution containing the phosphoric acid and the sulphuric acid is far larger than that of hydrogen chloride, and that the solubility of hydrogen chloride is rapidly reduced as the absorbing temperature increases. Also, it is observed from the data as shown in Table 4 that the solubility of hydrogen chloride is more reduced when the hydrofluoric acid is dissolved in the absorptive liquid, together with the phosphoric acid or the phosphoric acid and the sulphuric acid. Thus, it is possible to recover hydrogen fluoride with high purity from a mixed solution even if the mixed solution contains hydrogen fluoride and hydrogen chloride dissolved in the absorptive agent such as phosphoric acid or sulphuric acid because the hydrogen chloride can evaporate from the mixed solution at far lower temperature than the evaporating temperature of hydrogen fluoride.

Still further, the inventors have found that the solubility of hydrogen fluoride and hydrogen chloride is reduced more or less when they are absorbed in fluoro-phosphoric acid or a mixture of fluoro-phosphoric acid and fluoro-sulphuric acid in comparison with the solubility of hydrogen fluoride and hydrogen chloride when they are absorbed in phosphoric acid or a mixture of phosphoric acid and sulphuric acid.

This invention was discovered on the basis of the investigations as mentioned above and provides a method for recovering hydrogen fluoride from a gaseous mixture containing said hydrogen fluoride comprising the steps of contacting said gaseous mixture with at least one of absorptive liquids including phosphoric acid, poly-phosphoric acid or fluoro-phosphoric acid or mixtures thereof or a mixture of phosphoric acid and sulphuric acid, fuming sulphuric acid or sulphuric acid anhydride, or a mixture of poly-phosphoric acid and sulphuric acid, fuming sulphuric acid or sulphuric acid anhydride, or a mixture of phosphoric or poly-phosphoric acid and fluoro-sulphuric acid, or a mixture of phosphoric or poly-phosphoric acid, sulphuric acid, fuming sulphuric acid or sulphuric acid anhydride and fluoro-sulphuric acid, or a mixture of fluoro-phosphoric acid and sulphuric acid, fuming sulphuric acid or sulphuric acid anhydride, or a mixture of fluoro-phosphoric acid, and fluoro-sulphuric acid, or a mixture of fluoro-phosphoric acid, sulphuric acid, fuming sulphuric acid or sulphuric acid anhydride and fluoro-sulphuric acid, or a mixture of phosphoric or poly-phosphoric acid, fluoro-phosphoric acid and sulphuric acid, fuming sulphuric acid or sulphuric acid anhydride, or a mixture of phosphoric or poly-phosphoric acid, fluoro-phosphoric acid and fluoro-sulphuric acid, or a mixture of phosphoric or poly-phosphoric acid, fluoro-phosphoric acid, fluoro-sulphuric acid and sulphuric acid, fuming sulphuric acid or sulphuric acid anhydride thereby to absorb said hydrogen fluoride into said absorptive liquid and then recovering said hydrogen fluoride by heating the resultant absorptive liquid under evaporation.

The gaseous mixture used in this invention includes (1) a gaseous mixture of hydrogen fluoride and hydrogen halides other than said hydrogen fluoride, (2) a gaseous mixture of vinyl fluoride, 1,1-difluoroethane, acetylene and hydrogen fluoride which are produced by the reaction between acetylene and hydrogen fluoride and (3) a gaseous mixture of hydrogen fluoride, hydrogen halides other than said hydrogen fluoride and fluoro-halohydrocarbons which are produced by the reaction between hydrogen fluoride and halogenated hydrocarbons having at least one halogen atom other than fluorine, but it is noted that the application of this invention is not limited to the above mentioned gaseous mixtures. It is, however, preferable to use the substantially anhydrous gaseous mixtures.

In accordance with this invention, it is preferable to use a normal phosphoric acid ($H_3PO_4$) having a concentration of above 80% $P_2O_5$, and particularly above 95% $P_2O_5$. When the normal phosphoric acid is used in a concentration of below 80% $P_2O_5$, it is not desirable for recovering hydrogen fluoride by evaporating said hydrogen fluoride absorbed in the phosphoric acid because the substantial amount of water is distilled off and the recovered hydrogen fluoride is lowered in its concentration and also a large amount of impurities such as hydrogen halides other than the hydrogen fluoride is absorbed in such a phosphoric acid. The high concentration phosphoric acid is viscous at room temperature and poly-phosphoric acid having the high content of $P_2O_5$ is solid and therefore such a viscous phosphoric acid or such a solid poly-phosphoric acid is not intimately contacted with a gaseous mixture containing hydrogen fluoride when it is used at about room temperature for recovering hydrogen fluoride and the efficiency for recovery of hydrogen fluoride is lowered. Such a defect, however, is eliminated because the viscosity of high concentration phosphoric acid is reduced when such a phosphoric acid absorbs hydrogen fluoride to convert a portion of the phosphoric acid into fluoro-phosphoric acid. Thus, it is preferable to start the method of this invention with high efficiency for recovering hydrogen fluoride from a gaseous mixture containing said hydrogen fluoride and impurities by using an absorptive liquid which is a mixture of normal phosphoric acid or poly-phosphoric acid and fluoro-phosphoric acid, or fluoro-phosphoric acid alone, or a mixture of normal phosphoric acid or poly-phosphoric acid, fluoro-phosphoric acid and sulphuric acid or fluoro-sulphuric acid, or a mixture of normal phosphoric acid or poly-phosphoric acid and sulphuric acid or fluoro-sulphuric acid, or a mixture of fluoro-phosphoric acid and sulphuric acid or fluoro-sulphuric acid. It is preferable to use a high concentration sulphuric acid and it is usually used in a concentration of above 70% and particularly above 80%.

In accordance with this invention, it is preferable to use above 0.2 and preferably above 0.5 of the weight ratio of phosphoric acid to phosphoric acid plus sulphuric acid $\{H_3PO_4/(H_3PO_4+H_2SO_4)\}$ contained in the absorptive containing various types of phosphoric acids and/or the fluoro-phosphoric acid and the sulphuric acid and/or the fluoro-sulphuric acid as the phosphoric component and the sulphuric component are calculated for $H_3PO_4$ and $H_2SO_4$ respectively. When the absorptive liquid has the weight ratio of below 0.5, a large amount of acetylenic and ethylenic hydrocarbons is absorbed in the absorptive liquid and they are polymerized and carbonized, causing color and other trouble to the absorptive liquid.

Although the ortho-phosphoric acid can be used without trouble in this invention, the poly-phosphoric acid is reacted with the hydrogen fluoride to produce the fluoro-phosphoric acid and volatile fluoro-phosphorous fluorides, and hence the poly-phosphoric acid is lowered in its melting-point. Such volatile fluoro-phosphorous fluorides are mixed with the recovered hydrogen fluoride when the poly-phosphoric acid is used for recovering the hydrogen fluoride and the recovered hydrogen fluoride is lowered in its purity. Therefore, it is necessary to use the fluoro-phosphoric acid not essentially volatilizing at the temperature required for recovering the hydrogen fluoride. When the poly-phosphoric acid and the mixture of the ortho-phosphoric acid and the poly-phosphoric acid are used as the absorptive liquids, it is necessary to use such absorptive liquids after they are treated with hydrogen fluoride and then the volatile fluoro-phosphorous fluorides are removed or the poly-phosphoric acid is mixed with water or ortho-phosphoric acid for preventing the production of volatile fluoro-phosphoric acid. Also, fuming sulphuric acid and sulphuric acid anhydride have high vapor pressure and therefore it is desirable to convert them to fluoro sulphuric acid having low vapor pressure by previously treating them with hydrogen fluoride.

When the gaseous mixture containing hydrogen fluoride is absorbed in the absorptive liquid according to this invention, the absorbing temperature is lowered as possible without hindrance in the operation. When the hydrogen fluoride absorbed in the absorptive liquid is separated, the temperature is increased as possible without evaporation of the absorptive liquid. The absorption and evaporation hydrogen fluoride can, however, be conducted under normal pressure, reduced pressure or increased pressure. It is necessary to use an external cooling device when the hydrogen fluoride is absorbed because the absorption is proceeding with the evolution of heat.

In accordance with this invention, the acetylenic and ethylenic hydrocarbons are not essentially absorbed in the absorptive liquid and they are not polymerized and therefore the absorptive liquid can be used for a prolonged period of time without losing the hydrocarbons. Also, in accordance with this invention, the hydrogen fluoride is selectively absorbed in the absorptive liquid because the halogenated hydrogen compounds other than the hydrogen fluoride are not essentially absorbed in the absorptive liquid.

Apparatus used in this invention can be made of some metallic materials such as iron, iron alloy, copper alloys, nickel, Inconel and Hastelloy. Also some plastics such as polyethylene and poly-tetrafluoroethylene are also used. It should, however, avoid the use of copper alloys and copper when the gaseous mixture contains an acetylene gas.

The invention is illustrated by the following examples.

EXAMPLE 1

Normal phosphoric acid was pre-treated with a hydrogen fluoride gas by passing said gas through said acid and then the pre-treated normal phosphoric acid was allowed to stand for evaporating the hydrogen fluoride at room temperature. It is noted that the pre-treated normal phosphoric acid contains a certain amount of the residual hydrogen fluoride which was not evaporated. Now, 40 grams of such a pre-treated normal phosphoric acid (106% calculated as $H_3PO_4$) were charged into a washing bottle and then a gaseous mixture containing, by weight, 1.8% of carbon tetrachloride, 8.2% of fluorotrichloromethane, 39.6% of difluorodichloromethane, 0.5% of chlorotrifluoromethane, 26.6% of hydrogen chloride and 23.3% of hydrogen fluoride was bubbled into said phosphoric acid until 27.2 liters of said gaseous mixture were fed at 20° C. under cooling. The resultant product was analyzed for measuring the amount of hydrogen fluoride absorbed therein and also the resultant product was heated at 97° C. under atmospheric pressure for recovering hydrogen fluoride. The recovered hydrogen fluoride was measured. The results are given as follows and it should be understood that indicated numeral values were obtained by deducting the amount of the residual hydrogen fluoride from the amount of the hydrogen fluoride measured.

| | Grams |
|---|---|
| Amount of the absorbed hydrogen fluoride | 15 |
| Amount of the recovered hydrogen fluoride | 14.5 |
| Amount of unabsorbed hydrogen fluoride | 2 |

EXAMPLE 2

Normal phosphoric acid was pre-treated with a hydrogen fluoride gas in the same manner as in Example 1. 18.5 grams of such a pre-treated normal phosphoric acid (106% calculated as $H_3PO_4$) and 18.5 grams of sulphuric acid (99% calculated as $H_2SO_4$) were charged into a washing bottle and then the same gaseous mixture as in Example 1 was bubbled into the contact of the bottle in the same manner as in Example 1. The resultant product was heated at 97° C. under atmospheric pressure for recovering hydrogen fluoride. Hydrogen fluoride absorbed in the resultant product was analyzed.

The results are given as follows:

| | Grams |
|---|---|
| Amount of the absorbed hydrogen fluoride | 14.5 |
| Amount of the recovered hydrogen fluoride | 14.4 |
| Amount of unabsorbed hydrogen fluoride | 2.5 |

EXAMPLE 3

Normal phosphoric acid was pre-treated with a hydrogen fluoride gas in the same manner as in Example 1. 81 grams of such a pre-treated normal phosphoric acid (106% calculated as $H_3PO_4$) were charged into a washing bottle, and then a gaseous mixture containing, by weight, 43.9% of 1,1-difluoroethane, 38.4% of vinyl fluoride, 0.4% of acetylene and 17.3% hydrogen fluoride was bubbled into said phosphoric acid until 64 liters of said gaseous mixture had been fed at 20° C. under cooling.

The resultant product was analyzed for measuring the amount of hydrogen fluoride absorbed therein and also the resultant product was heated at 97° C. under atmospheric pressure for recovering hydrogen fluoride. The recovered hydrogen fluoride was measured.

The results are given as follows:

| | Grams |
|---|---|
| Amount of the absorbed hydrogen fluoride | 16.5 |
| Amount of the recovered hydrogen fluoride | 16.4 |
| Amount of unabsorbed hydrogen fluoride | 2.3 |

What we claim is:

1. A method for recovering hydrogen fluoride which comprises contacting a gaseous mixture containing said hydrogen fluoride with an absorptive liquid having a $P_2O_5$ concentration of above 80% selected from phosphoric acid or poly-phosphoric acid or fluoro-phosphoric acid or a mixture of phosphoric acid and fluoro-phosphoric acid or a mixture of poly-phosphoric acid and fluoro-phosphoric acid thereby to absorb said hydrogen fluoride into said absorptive liquid, and then recovering by evaporation said hydrogen fluoride by heating the resultant absorptive liquid.

2. A method for recovering hydrogen fluoride, which comprises contacting a gaseous mixture containing said hydrogen fluoride with an absorptive liquid selected from a mixture of phosphoric acid and sulphuric acid or a mixture of poly-phosphoric acid and sulphuric acid or a mixture of phosphoric acid and fluoro-sulphuric acid or a mixture of poly-phosphoric acid and fluoro-sulphuric acid or a mixture of phosphoric acid, sulphuric acid and fluoro-sulphuric acid or a mixture of poly-phosphoric acid, sulphuric acid and fluoro-sulphuric acid or a mixture of fluoro-phosphoric acid and sulphuric acid or a mixture of fluoro-phosphoric acid and fluoro-sulphuric acid or a mixture of fluoro-phosphoric acid, sulphuric acid and fluoro-sulphuric acid or a mixture of phosphoric acid, fluoro-phosphoric acid and sulphuric acid or a mixture of poly-phosphoric acid, fluoro-phosphoric acid and sulphuric acid, or a mixture of phosphoric acid, fluoro-phosphoric acid and fluoro-sulphuric acid of a mixture of poly-phosphoric acid, fluoro-phosphoric acid and fluoro-sulphuric acid or a mixture of phosphoric acid, fluoro-phosphoric acid, sulphuric acid and fluoro-sulphuric acid or a mixture of poly-phosphoric acid, fluoro-phosphoric acid, sulphuric acid and fluoro-sulphuric acid thereby to absorb said hydrogen fluoride into said absorptive liquid and then recovering said hydrogen fluoride by heating the resultant absorptive liquid under evaporation.

3. The method for recovering hydrogen fluoride according to claim 2, wherein the sulphuric acid is used at a concentration of above 70%.

4. The method for recovering hydrogen fluoride according to claim 2, wherein the weight ratio of phosphoric acid to phosphoric acid plus sulphuric acid contained in one of absorptive liquids including the phosphoric acid and/or the poly-phosphoric acid and/or the fluoro-phosphoric acid and the sulphuric acid and/or the fluoro-sulphuric acid is above 0.5 when the phosphoric component and the sulphuric component are calculated for $H_3PO_4$ and $H_2SO_4$ respectively.

5. The method for recovering hydrogen fluoride according to claim 1, wherein the gaseous mixture contains hydrogen fluoride, other hydrogen halides than hydrogen fluoride and acetylenic or ethylenic hydrocarbons.

6. The method for recovering hydrogen fluoride according to claim 2 wherein the gaseous mixture contains hydrogen fluoride, other hydrogen halides than hydrogen fluoride and acetylenic or ethylenic hydrocarbons.

7. The method for recovering hydrogen fluoride according to claim 2 wherein the phosphoric acid is used at a concentration of above 80%.

8. The method for recovering hydrogen fluoride according to claim 2 wherein the fluoro-phosphoric acid has the lower vapor pressure and is not substantially evaporated at a temperature required for evaporating and recovering the hydrogen fluoride.

9. A method according to claim 2 wherein the gaseous mixture contains hydrogen fluoride, hydrogen halides other than hydrogen fluoride, and acetylenic or ethylenic hydrocarbons.

References Cited
UNITED STATES PATENTS

| | | | |
|---|---|---|---|
| 3,091,513 | 5/1963 | Parish | 23—153 |
| 3,273,713 | 9/1966 | Parish | 23—153 |
| 3,386,892 | 6/1968 | Schmidt et al. | 23—153 |
| 3,415,039 | 10/1968 | Rushton et al. | 55—71 |

SAMIH N. ZAHARNA, Primary Examiner

R. W. BURKS, Assistant Examiner